Jan. 6, 1931. F. J. BLACK 1,788,079
LOCOMOTIVE AND LIKE WHEEL
Filed Sept. 30, 1929
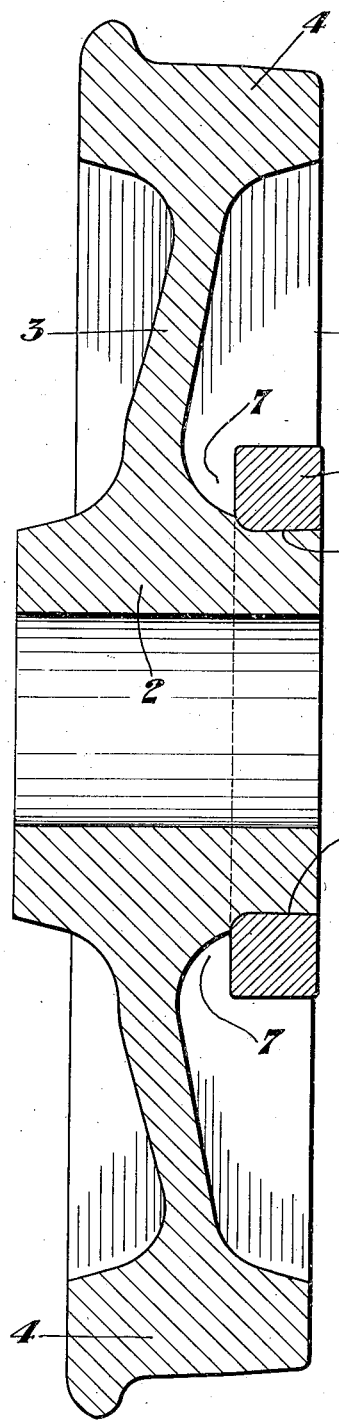
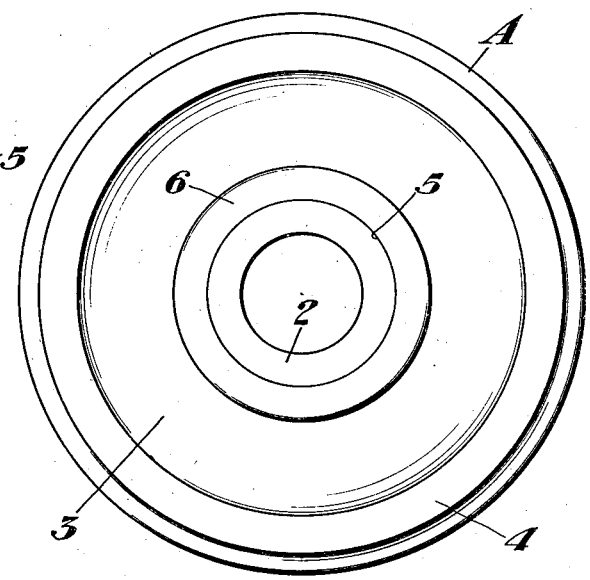
Inventor:
FRANK J. BLACK
by: Usina + Rauber
his Attorneys.

Patented Jan. 6, 1931

1,788,079

UNITED STATES PATENT OFFICE

FRANK J. BLACK, OF PITTSBURGH, PENNSYLVANIA

LOCOMOTIVE AND LIKE WHEEL

Application filed September 30, 1929. Serial No. 396,298.

This invention relates to wheels and more particularly to locomotive truck wheels for heavy duty, and has for its object the provision of a novel hub construction for such wheels whereby cracking, due to friction heat created in the journals, is eliminated and the wear caused by the journal bearings is materially reduced, thereby increasing the life of such wheels.

Locomotive wheels for heavy duty are preferably made from high carbon steel in order to withstand the heavy loads imposed upon them. High carbon steel, however, is susceptible to heat cracking and, due to the heat generated in the journal boxes of the locomotives and communicated to said wheels, numerous failures occurred from heat cracking.

It has also been noted that the journal ends of the hubs of the high carbon wheels were readily cut away by the journal bearings so that a deep groove was formed after a relatively short service which weakened the hub.

The present invention provides a low carbon band on the hub of the wheel which serves as a wear and reinforcing member which is not affected by the heat generated in the journal box as is the high carbon steel of the wheel.

In the drawings:

Figure 1 is a vertical section through a wheel constructed in accordance with this invention.

Figure 2 is a side elevation thereof.

Referring more particularly to the drawings, the letter A designates a locomotive truck wheel of generally standard design except for the hub construction.

The wheel A comprises a hub portion 2, a web portion 3, and a flanged rim portion 4 all formed integral from high carbon steel so as to withstand the heavy loads to which such wheels are subjected.

In order to reinforce the hub portion and prevent heat cracks developing, due to the heat generated in the journal boxes of the locomotive, and at the same time reduce the wear occasioned by the journal bearings, the journal end of the hub is reduced in diameter to form a rabbet, as at 5, either during the forming of the wheel or by machining after the wheel is completed, and a low carbon one-piece band 6 is shrunk on said reduced diameter portion 5 of said hub.

The band 6 is of substantially rectangular cross-section and is of such thickness that its outside diameter is materially greater than the original wheel hub so that an air space 7 is provided between the wheel and the band or ring 6. The air space 7, coupled with the increased surface of the band, serves to maintain the journal end of the hub cooler than it would be in its original shape.

The low carbon steel band 6 is not affected by the heat generated in the journal box like the high carbon steel of the hub and, therefore, this band will not be subjected to heat cracks.

Another advantage of the band or ring 6 is that, due to its low carbon content and softer nature, it is polished rather than cut by the journal bearings and, therefore, the life of the wheel is increased.

It will be understood that while I have shown and described one specific embodiment of my invention I do not wish to be limited thereto since various modifications may be made without departing from the scope thereof as defined in the appended claims, such as applying the band to other than locomotive wheels, reducing or increasing the size of the band, applying the band to either or both ends of the hub, and welding or otherwise securing the band in place.

I claim:

1. A wheel for railroad engine trucks and the like comprising a hub portion, web portion and flanged rim portion all formed integral and composed of high carbon steel, said hub portion having a rabbet on at least its journal end, and a one-piece low carbon steel band shrunk on said rabbeted portion of said hub.

2. A wheel for railroad engine trucks and the like comprising a hub portion, web portion and flanged rim portion all formed integral and composed of high carbon steel, said hub portion having a rabbet on its journal end, and a one-piece low carbon steel band shrunk on said rabbeted portion of said hub, said band being of such thickness that the journal end of the hub with said band in place will have a materially greater diameter than the other end thereof.

3. A wheel for railroad engine trucks and the like comprising a hub portion, web portion and flanged rim portion all formed integral and composed of high carbon steel, said hub portion being rabbeted at its journal end, and a one-piece low carbon steel band mounted on said rabbeted portion of said hub.

4. A wheel for railroad engine trucks and the like comprising a hub portion, web portion and flanged rim portion all formed integral and composed of high carbon steel, and a one-piece low carbon steel band shrunk on the journal end of said hub.

5. A metal wheel for railroad engine trucks and the like having a hub portion on the journal end of which is a band of metal which is less susceptible to heat cracking than the metal of said hub portion.

6. A metal wheel for railroad engine trucks and the like having a hub portion on the journal end of which is a band of metal which is less susceptible to heat cracking than the metal of said hub portion, said band having its outer diameter materially greater than that of said hub portion.

7. A metal wheel for railroad engine trucks and the like having a hub portion on the journal end of which is a band of metal which is less susceptible to heat cracking than the metal of said hub portion, said band having its outer diameter materially greater than that of said hub portion and spaced away from the web of the wheel.

In testimony whereof, I have hereunto set my hand.

FRANK J. BLACK.